United States Patent
Holobinko et al.

(10) Patent No.: US 10,771,269 B2
(45) Date of Patent: Sep. 8, 2020

(54) AUTOMATED INTELLIGENT NODE FOR HYBRID FIBER-COAXIAL (HFC) NETWORKS

(71) Applicant: Cisco Technology, Inc., San Jose, CA (US)

(72) Inventors: John Holobinko, Fort Mill, SC (US); John Alexander Ritchie, Jr., Duluth, GA (US); John Skrobko, Berkeley Lake, GA (US); Huang Ping, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 72 days.

(21) Appl. No.: 15/917,430

(22) Filed: Mar. 9, 2018

(65) Prior Publication Data

US 2019/0280886 A1    Sep. 12, 2019

(51) Int. Cl.
| | |
|---|---|
| *H04L 12/12* | (2006.01) |
| *H04L 12/64* | (2006.01) |
| *H04L 12/24* | (2006.01) |
| *H04L 12/28* | (2006.01) |

(52) U.S. Cl.
CPC ......... *H04L 12/12* (2013.01); *H04L 12/2801* (2013.01); *H04L 12/2885* (2013.01); *H04L 12/6418* (2013.01); *H04L 41/046* (2013.01); *H04L 41/0813* (2013.01); *H04L 41/0823* (2013.01); *H04L 41/0866* (2013.01); *H04L 2012/6421* (2013.01)

(58) Field of Classification Search
None
See application file for complete search history.

(56) References Cited

U.S. PATENT DOCUMENTS

| | | | | |
|---|---|---|---|---|
| 2004/0101304 A1* | 5/2004 | McGregor | .......... | H04L 12/2801 398/71 |
| 2005/0027851 A1* | 2/2005 | McKeown | .......... | H04L 12/2874 709/224 |
| 2005/0027985 A1* | 2/2005 | Sprunk | ................. | G06F 21/606 713/171 |
| 2007/0217436 A1 | 9/2007 | Markley et al. | | |

(Continued)

FOREIGN PATENT DOCUMENTS

| | | |
|---|---|---|
| KR | 100697807 B1 | 3/2007 |
| KR | 100877155 B1 | 1/2009 |

OTHER PUBLICATIONS

Society of Cable Telecommunications Engineers, Engineering Committee, Energy Management Subcommittee, American National Standard, ANSI/SCTE 216 2015, Adatpive Power System Interface Specification (APSIS), pp. 1-26.

(Continued)

*Primary Examiner* — Brian Whipple
(74) *Attorney, Agent, or Firm* — Merchant Gould P.C.

(57) ABSTRACT

Automated intelligent node setup and configuration in a Hybrid Fiber-Coaxial (HFC) Network may be provided. First, a desired operating profile for a node connected in a Hybrid Fiber-Coaxial (HFC) network may be determined by a computing device. Next, based on the desired operating profile, a setting for at least one component in the node may be determined by the computing device. Then the at least one component in the node may be adjusted remotely by the computing device to the determined setting.

20 Claims, 4 Drawing Sheets

(56) References Cited

U.S. PATENT DOCUMENTS

| | | | |
|---|---|---|---|
| 2007/0264011 A1* | 11/2007 | Sone | .................. H04J 14/0204 398/10 |
| 2008/0134165 A1 | 6/2008 | Anderson | |
| 2012/0008623 A1* | 1/2012 | Yazaki | .................... H04L 45/00 370/389 |
| 2014/0150047 A1 | 5/2014 | Rakib | |
| 2014/0199081 A1 | 7/2014 | Ling | |
| 2015/0249673 A1* | 9/2015 | Niemoeller | ........... H04W 12/08 726/4 |

OTHER PUBLICATIONS

Combined Search and Examination Report issued in application GB1903077.4, dated Sep. 2, 2019, (8 pages).

\* cited by examiner

US 10,771,269 B2

AUTOMATED INTELLIGENT NODE FOR HYBRID FIBER-COAXIAL (HFC) NETWORKS

TECHNICAL FIELD

The present disclosure relates generally to downstream node setup.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services. Systems incorporate additional elements to transmit signals upstream from the subscriber to the distribution facility.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
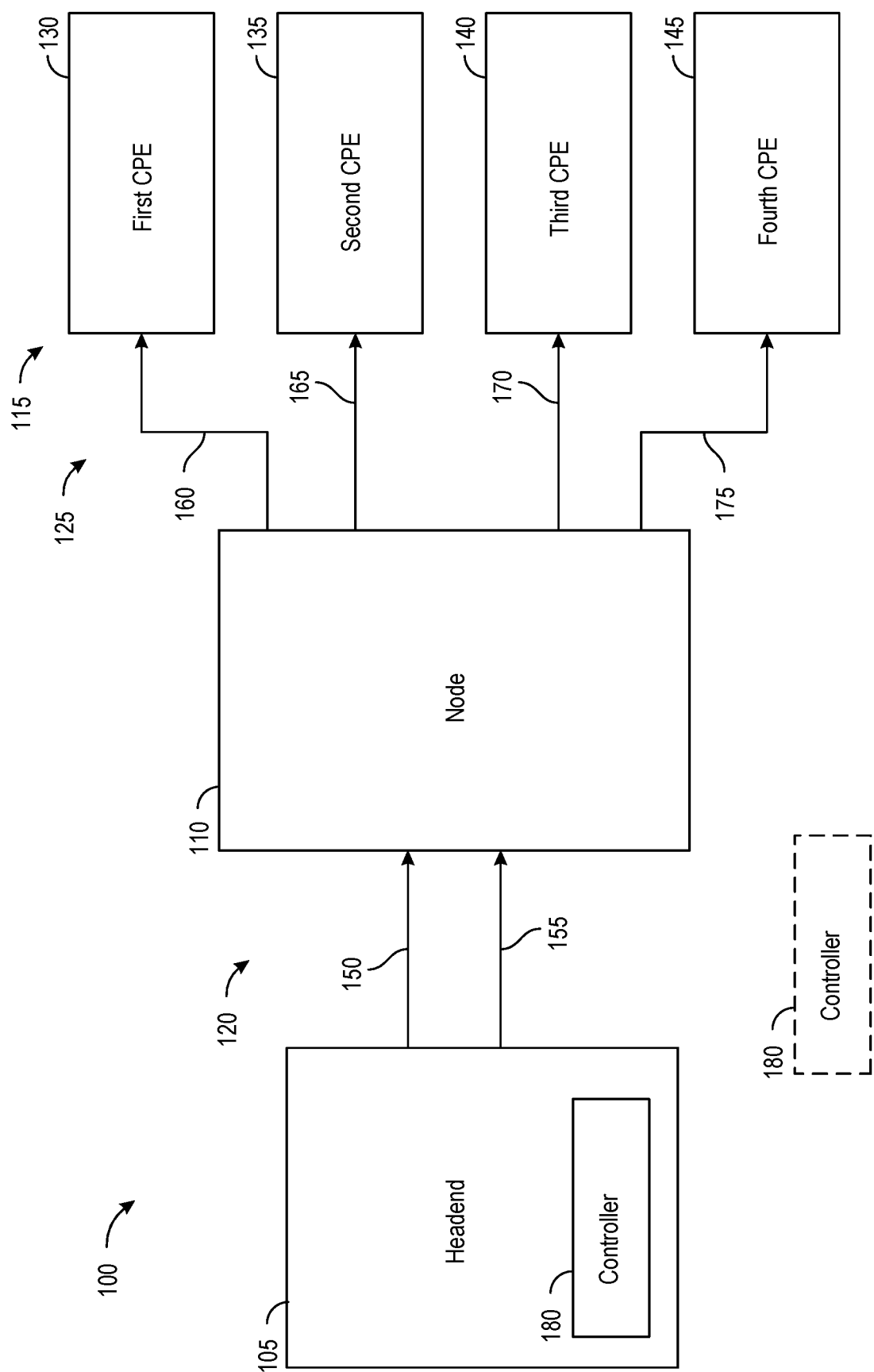
FIG. 1 is a block diagram of a communication system.

Automated intelligent node setup and configuration in a Hybrid Fiber-Coaxial (HFC) Network may be provided. First, a desired operating profile for a node connected in a Hybrid Fiber-Coaxial (HFC) network may be determined by a computing device. Next, based on the desired operating profile, a setting for at least one component in the node may be determined by the computing device. Then the at least one component in the node may be adjusted remotely by the computing device to the determined setting.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems. Fiber deep (FD) is a trend in which MSOs push fiber ever closer to customers to provide them with better service. As opposed to an amplifier, a Hybrid Fiber Coaxial (HFC) node may receive signals from a headend via fiber optic cable rather than via coaxial cable for example. In order to provide FD, many HFC nodes may be deployed onto an FD network.

A conventional node may be manually configured by a technician. For example, signal levels in each direction may be changed by manually inserting pads and equalizers into plug-in locations in a Radio Frequency (RF) amplifier section of the conventional node while simultaneously using an external spectrum analyzer connected to test points on the conventional node to determine actual signal levels. Accordingly, the conventional node may not be installed and operated over its lifetime without opening the node's cover.

A node consistent with embodiments of the disclosure may be installed and automatically recognized in the HFC network when connected for the first time according to a pre-defined profile. In this way, it may automatically set itself up and operate, report back information to any authorized person on both its own behavior and the behavior of the return path using, for example, Ethernet communications. Accordingly, embodiments of the disclosure may eliminate the need for external test points and external test equipment. In addition, embodiments of the disclosure may detected changes made by technicians automatically if the technicians are granted change privileges or may keep technicians from being able to make changes to node signals altogether. Furthermore, based on the ability to display remotely the cable system waveforms on each of its legs, nodes consistent with embodiments of the disclosure may reduce time to track down and repair cable access system issues, and can also enable remote remediation of some issues before the need to dispatch a technician.

Embodiments of the disclosure may also enable power savings by enabling remote programming and control of each output, consistent with the channel load on each output, or turning the output completely off if it is not used. Nodes consistent with embodiments of the disclosure may also automatically shut down when stolen from the network making the node worthless to an unauthorized person or company in its possession.

FIG. 1 is a block diagram of a communication system 100. As shown in FIG. 1, communication system 100 may comprise a headend 105, a node 110, a plurality of customer premises equipment 115, a plurality of headend communication lines 120, and a plurality of node communication lines 125. Headend 105 may comprise, but is not limited to, a cable television headend that may comprise a master facility for receiving television signals for processing and distribution over a cable television system. Node 110 may receive downstream signals from headend 105 via fiber optic cable (e.g., headend communication lines 120) rather than via coaxial cable for example.

Plurality of customer premises equipment 115 may comprise, for example, any terminal and associated equipment located at a subscriber's premises and connected with a carrier's telecommunication channel at a demarcation point. Plurality of customer premises equipment 115 may comprise a first customer premises equipment 130, a second customer premises equipment 135, a third customer premises equipment 140, and a fourth customer premises equipment 145. Ones of plurality of customer premises equipment 115, may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Plurality of headend communication lines 120 may comprise a first headend communication line 150 and a second headend communication line 155. Headend communication lines 120 may comprise optical fibers. Plurality of node communication lines 125 may comprise a first node communication line 160, a second node communication line 165, a third node communication line 170, and a fourth node communication line 175. Plurality of node communication lines 125 may comprise coaxial cables of varying lengths. While FIG. 1 shows each one of plurality of node communication lines 125 as serving one customer premises equipment, each one of plurality of node communication lines 125 may serve many customer premises equipment locations and is not limited to one.

Communication system 100 may further comprise a controller 180. Controller 180 may be embodied in hardware and/or in software (including firmware, resident software, micro-code, etc.). Controller 180 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. For example, controller 180 may be operated by an operator located at headend 105 or may be operated by a field technician working on the HFC network comprising node 110.

Figure 2:
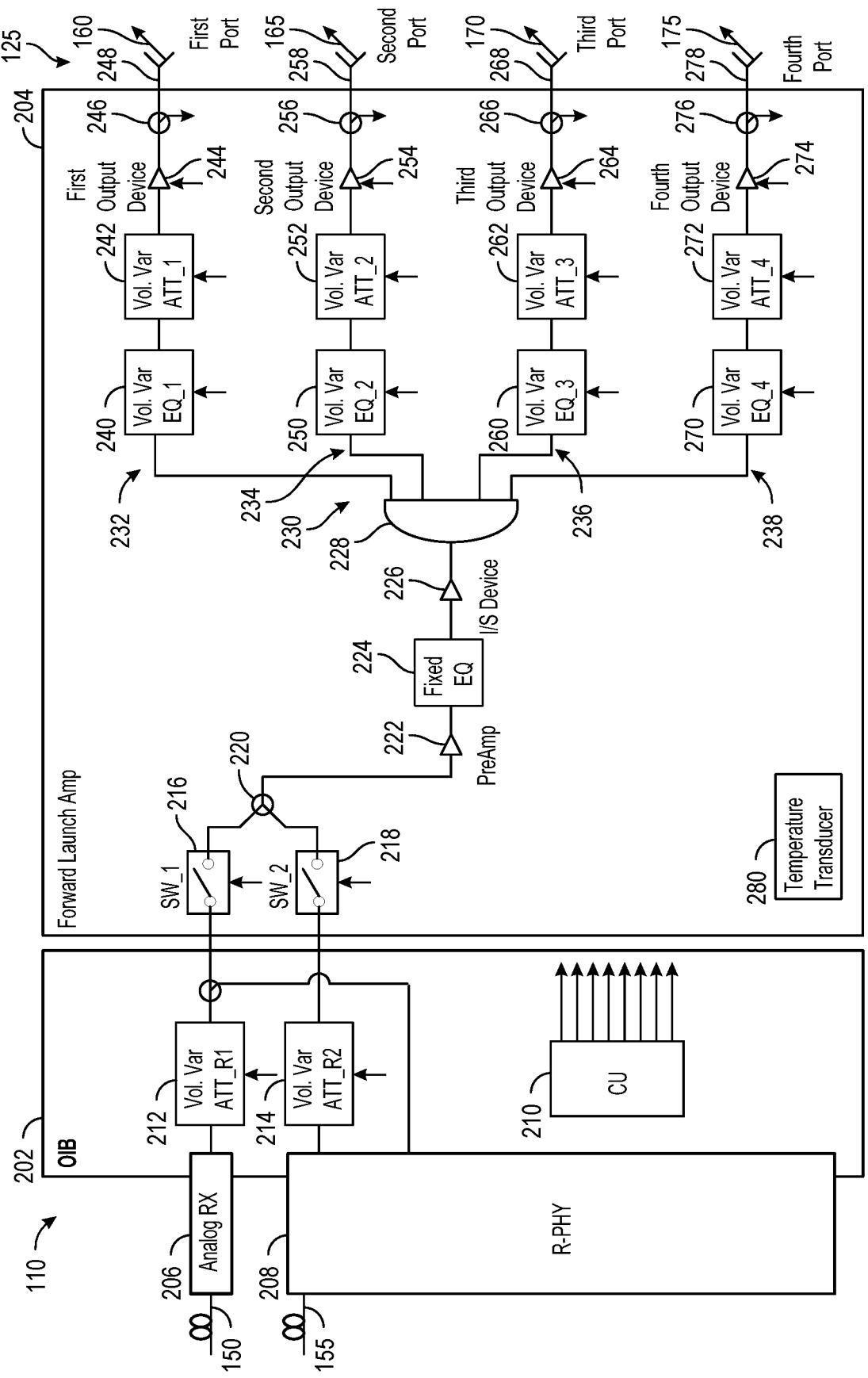
FIG. 2 is a block diagram of a node.

FIG. 2 is a block diagram of node 110. Node 110 is an example node and other nodes with other configurations may be used consistent with embodiments of the disclosure. As shown in FIG. 2, node 110 may comprise an optical interface board 202 and a forward launch amplifier 204. Optical interface board 202 may comprise an analog receiver 206, a remote physical layer circuit 208, and a control unit 210. Analog receiver 206 may feed an analog receiver voltage variable attenuator 212 and remote physical layer circuit 208 may feed a remote physical layer circuit voltage variable attenuator 214. Analog receiver voltage variable attenuator 212 and remote physical layer circuit voltage variable attenuator 214 may be used to control the level (e.g., amplitude) of their respective input signals. Analog receiver voltage variable attenuator 212 and remote physical layer circuit voltage variable attenuator 214 may be controlled by control unit 210. Control unit 210 may comprise a computing device as described in more detail below with respect to FIG. 4. While FIG. 2 shows control unit 210 as being disposed in node 110, in other embodiments, control unit 210 may be located remote from node 110, for example, on the Cloud. Furthermore, when located at node 110, control unit 210 may be located in optical interface board 202 or in forward launch amplifier 204.

First headend communication line 150 may provide analog receiver 206 with an analog optical signal from headend 105. Analog receiver 206 may convert the received analog optical signal to an electrical signal and then feed this electrical signal to analog receiver voltage variable attenuator 212. Second headend communication line 155 may provide remote physical layer circuit 208 with a digital optical signal from headend 105. Remote physical layer circuit 208 may convert the received digital optical signal into an analog electrical signal and feed this signal to remote physical layer circuit voltage variable attenuator 214.

Embodiments of the disclosure shown in FIG. 2 may be considered an overlay of an analog receiver and a remote physical layer circuit. Other embodiments may be similar to the embodiments shown in FIG. 2, but without remote physical layer circuit 208 (i.e., analog RX only). Also, other embodiments of the disclosure may be similar to the embodiments shown in FIG. 2, but without analog receiver 206 (i.e., remote PHY only).

Forward launch amplifier 204 may comprise a first switch 216, a second switch 218, a combiner 220, a preamplifier 222, a fixed equalizer 224, an interstage device 226, a splitter 228, and a plurality of branches 230. When closed, first switch 216 may provide combiner 220 with the signal from analog receiver voltage variable attenuator 212. Similarly, when closed, second switch 218 may provide combiner 220 with the signal from remote physical layer circuit voltage variable attenuator 214.

Combiner 220 may combine any received signals from first switch 216 and second switch 218 and then feed this combined signal in to preamplifier 222. Fixed equalizer 224 may receive the signal from preamplifier 222, suppress the amplitude of lower frequencies, and feed the signal to interstage device 226. Interstage device 226 may add "gain" (e.g., as much as 20 dB) to the signal and pass the signal onto splitter 228. Plurality of node communication lines 125 may comprise coaxial cables that may attenuate higher frequencies. Interstage device 226 may add "gain" to the signal in order to provide a substantially equal gain across all frequencies. Fixed equalizer 224 may add "tilt" to compensate for the attenuation that may be caused by plurality of node communication lines 125 (e.g., coaxial cables).

Splitter 228 may pass the signal onto plurality of branches 230. Plurality of branches 230 may comprise a first branch 232, a second branch 234, a third branch 236, and a fourth branch 238. While FIG. 2 shows plurality of branches 230 comprising four branches, embodiments of the disclosure are not limited to four and may comprise any number of branches.

First branch 232 may comprise a first branch voltage variable equalizer 240, a first branch voltage variable attenuator 242, a first branch output device 244, a first branch directional coupler 246, and a first port 248. Under the control of control unit 210, first branch voltage variable equalizer 240 may adjust the tilt of the signal on first branch 232. Similarly, under the control of control unit 210, first branch voltage variable attenuator 242 may adjust the level (e.g., amplitude) of the signal on first branch 232 across all frequencies. First branch output device 244 may amplify the signal from first branch 232 as it comes out of first branch voltage variable attenuator 242 on its way to first port 248.

Control unit 210 may control first branch voltage variable equalizer 240 and first branch voltage variable attenuator 242 based on feedback from first branch directional coupler 246. First branch directional coupler 246 may provide control unit 210 with a sample of the signal from first branch 232 that is output to first port 248. The signal from first output on port 248 may be carried by first node communication line 160 to first customer premises equipment 130.

Second branch 234 may comprise a second branch voltage variable equalizer 250, a second branch voltage variable attenuator 252, a second branch output device 254, a second branch directional coupler 256, and a second port 258. Under the control of control unit 210, second branch voltage variable equalizer 250 may adjust the tilt of the signal on second branch 234. Similarly, under the control of control unit 210, second branch voltage variable attenuator 252 may adjust the level (e.g., amplitude) of the signal on second branch 234 across all frequencies. Second branch output device 254 may amplify the signal from second branch 234 as it comes out of second branch voltage variable attenuator 252 on its way to second port 258.

Control unit 210 may control second branch voltage variable equalizer 250 and second branch voltage variable attenuator 252 based on feedback from second branch directional coupler 256. Second branch directional coupler 256 may provide control unit 210 with a sample of the signal from second branch 234 that is output to second port 258. The signal from second output on port 258 may be carried by second node communication line 165 to second customer premises equipment 135.

Third branch 236 may comprise a third branch voltage variable equalizer 260, a third branch voltage variable attenuator 262, a third branch output device 264, a third branch directional coupler 266, and a third port 268. Under the control of control unit 210, third branch voltage variable equalizer 260 may adjust the tilt of the signal on third branch 236. Similarly, under the control of control unit 210, third branch voltage variable attenuator 262 may adjust the level (e.g., amplitude) of the signal on third branch 236 across all frequencies. Third branch output device 264 may amplify the signal from third branch 236 as it comes out of third branch voltage variable attenuator 262 on its way to third port 268.

Control unit 210 may control third branch voltage variable equalizer 260 and third branch voltage variable attenuator 262 based on feedback from third branch directional coupler 266. Third branch directional coupler 266 may provide control unit 210 with a sample of the signal from third branch 236 that is output to third port 268. The signal from third output on port 268 may be carried by third node communication line 170 to third customer premises equipment 140.

Fourth branch 238 may comprise a fourth branch voltage variable equalizer 270, a fourth branch voltage variable attenuator 272, a fourth branch output device 274, a fourth branch directional coupler 276, and a fourth port 278. Under the control of control unit 210, fourth branch voltage variable equalizer 270 may adjust the tilt of the signal on fourth branch 238. Similarly, under the control of control unit 210, fourth branch voltage variable attenuator 272 may adjust the level (e.g., amplitude) of the signal on fourth branch 238 across all frequencies. Fourth branch output device 274 may amplify the signal from fourth branch 238 as it comes out of fourth branch voltage variable attenuator 272 on its way to fourth port 278.

Control unit 210 may control fourth branch voltage variable equalizer 270 and fourth branch voltage variable attenuator 272 based on feedback from fourth branch directional coupler 276. Fourth branch directional coupler 276 may provide control unit 210 with a sample of the signal from fourth branch 238 that is output to fourth port 278. The signal from fourth output on port 278 may be carried by fourth node communication line 175 to fourth customer premises equipment 145.

Collectively, first port 248, second port 258, third port 268, and fourth port 278 may comprise the plurality of ports. Furthermore, node 110 may comprise a temperature transducer 280 that may provide control unit 210 with the ambient temperature inside node 110.

Embodiments of the disclosure may include measurement modules comprising, but not limited to, one or more spectrum measurement modules. The one or more spectrum measurement modules may be embodied in hardware and/or in software (including firmware, resident software, microcode, etc.). The spectrum measurement module or modules may pick up the upstream or downstream monitoring signals from first branch directional coupler 246, second branch directional coupler 256, third branch directional coupler 266, and fourth branch directional coupler 276. Any of the one or more spectrum measurement modules may perform a spectrum capture and provide it to control unit 210. Consistent with embodiments of the disclosure, the functionality of the spectrum measurement modules may be incorporated into control unit 210. Similarly, measurement devices for obtaining modulation error ratio (MER) and/or bit error rate (BER) measurements may be included in embodiments of the disclosure. These measurements may be provided to control unit 210. Measurement devices for obtaining MER and BER measurements may be incorporated into control unit 210 as well. Accordingly, embodiments of the disclosure may control RF (levels and tilts) and power dissipation (amplifier biasing and linearity) of HFC nodes.

Figure 3:
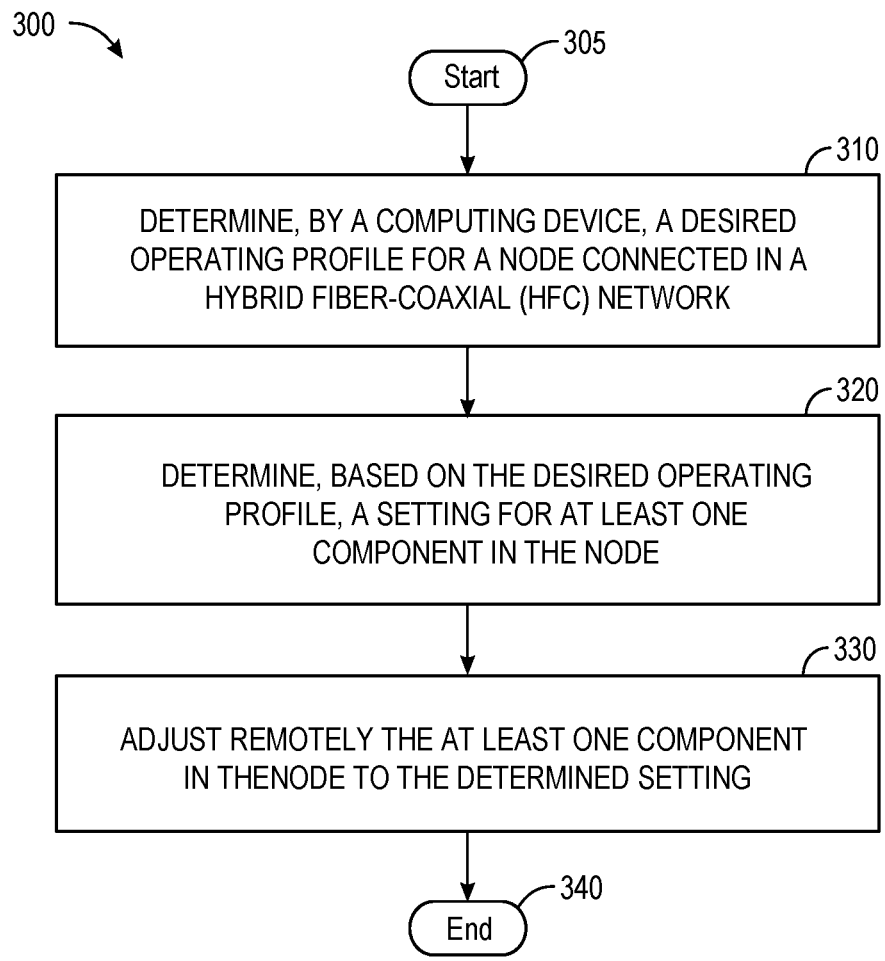
FIG. 3 is a flow chart of a method for providing automated intelligent node setup and configuration in a Hybrid Fiber-Coaxial (HFC) Network.

FIG. 3 is a flow chart setting forth the general stages involved in a method 300 consistent with embodiments of the disclosure for providing automated intelligent node setup and configuration in a Hybrid Fiber-Coaxial (HFC) Network. Method 300 may be implemented using controller 180 as described in more detail above with respect to FIG. 2. A computing device 400 may comprise an operating environment for controller 180 as described in greater detail below with respect to FIG. 4. Controller 180 may be operated by an operator located at headend 105 or may be operated by a field technician working on the HFC network comprising node 110. Ways to implement the stages of method 300 will be described in greater detail below.

Method 300 may begin at starting block 305 and proceed to stage 310 where controller 180 may determine a desired operating profile for node 110 connected in the HFC network. For example, node 110 may be placed on the HFC network. Some or all of plurality of node communication lines 125 may be connected to node 110 that may correspondingly serve some or all of plurality of customer premises equipment 115 as shown in FIG. 1. Based, for example, on the location of node 110 in the HFC network, the lengths of ones of the plurality of node communication lines 125, and the types of service connections to plurality of customer premises equipment 115, a desired operating profile for node 110 may be determined. The desired operating profile for node 110 may comprise a desired amount of signal tilt for signals on first port 248, second port 258, third port 268, or fourth port 278. Similarly, the desired operating profile for node 110 may comprise a level amount (e.g., amplitude) across all frequencies for signals on first port 248, second port 258, third port 268, or fourth port 278. The desired operating profile may include other parameters and is not limited to tilt or level amount.

From stage 310, where controller 180 determines the desired operating profile for node 110 connected in the HFC network, method 300 may advance to stage 320 where controller 180 may determine, based on the desired operating profile, a setting for at least one component in node 110. As described above, the at least one component may comprise any of a plurality of adjustable component in node 110. For example node 110 shown in FIG. 2, the plurality of adjustable component for which a desired setting may be determined may comprise, but are not limited to: analog receiver voltage variable attenuator 212, remote physical layer circuit voltage variable attenuator 214, first switch 216, second switch 218, first branch voltage variable equalizer 240, first branch voltage variable attenuator 242, first branch output device 244, second branch voltage variable equalizer 250, second branch voltage variable attenuator 252, second branch output device 254, third branch voltage variable equalizer 260, third branch voltage variable attenuator 262, third branch output device 264, fourth branch voltage variable equalizer 270, fourth branch voltage variable attenuator 272, and fourth branch output device 274. Node 110 is an example and embodiments of the disclosure may operate in conjunction with any type node having any number or type of adjustable components.

Consistent with embodiments of the disclosure, the desired operating profile may include one or more of plurality of node communication lines 125 fed from node 110 to be turned off. For example, node 110 may be placed in the HFC where not all of its ports may be needed to serve customers. In other words, only three of its four ports may be needed to serve customers for example. In this case, with conventional systems, an attenuator (i.e., a resistor) may be placed on the unused port to dissipate power at the unused port. This may be undesirable because energy may be wasted by the attenuator with conventional systems. Embodiments of the disclosure, however, may save energy by turning off power being fed to an unused port. The power may be turned off to a port by setting a component in node 100 to accomplish this. For example, if the desired operating profile includes fourth port 278 comprising an unused port on node 110, a determined setting may comprise fourth output device 274 causing no power (i.e., no signal) to be provided to fourth port 278. Other components in node 110 may cause no power to be provided to fourth port 278 and the component is not limited to fourth output device 274. Consequently, embodiments of the disclosure may cause energy to be saved.

Furthermore, consistent with embodiments of the disclosure, the desired operating profile may include one or more of plurality of node communication lines 125 being fed from node 100 with a power level that matches an operating spectrum of customer premises equipment connected to the one of the plurality of node communication lines fed from the node. This matching may be done on a leg-by-leg basis or may be done globally for all legs. For example, first port 248 may be configured to provide 1.2 GHz of bandwidth. With conventional systems, the power to service bandwidth may be fixed. With embodiments of the disclosure, however, the power to service bandwidth on a port (e.g., first port 248) may be adjusted based on a power level that matches an operating spectrum of customer premises equipment (e.g., customer premises equipment 130) connected to first port 248. For example, if the operating spectrum of first port 248 comprises a maximum of 700 MHz, embodiments of the disclosure may reduce the power to service bandwidth on first port 248 from a power level to service 1.2 GHz of bandwidth to a power level to service 860 MHz of bandwidth (i.e., a level less than a maximum power capable of being provided to first port 248, but greater than the operating spectrum of first port 248). In this way, an energy savings may be accomplished by this power reduction. The operating spectrum may be tested and this adjustment may be performed periodically (e.g., hourly, daily, monthly, yearly, etc.) by a process operating on control unit 210 or controller 180 for example. This adjustment may be initiated by an operator. The operating spectrum of first port 248 may be provided to controller 180 via first branch directional coupler 246 as described above with respect to FIG. 2. Adjusting settings on first output device 244 may cause this change in power being provided to first port 248. Other components in node 110 may cause this power change to fourth port 278 and the component is not limited to fourth output device 274. Consequently, embodiments of the disclosure may cause energy to be saved. Should the operating spectrum of first port 248 decrease or increase, embodiments of the disclosure may make corresponding decreases or increases the power to service bandwidth on first port 248.

In addition, consistent with embodiments of the disclosure, a process operating on control unit 210 or controller 180 may analyzing the distribution of Signal-to-Noise Ratio (SNR) of customer premises equipment connected to node 110. If the SNR distribution of one of more legs on node 110 shows statistically high, this may mean that the power on the one of more legs may be reduced by lowering the output RF power level for benefit of the power savings.

Once controller 180 determines the setting for the at least one component in node 110 in stage 320, method 300 may continue to stage 330 where controller 180 may adjust remotely the at least one component in node 110 to the determined setting. For example, controller 180 may communicate the determined setting for the at least one component in node 110 to control unit 210. Then control unit 210 may cause the at least one component to be adjusted to the determined setting. After the at least one component is adjusted remotely to the determined setting, this adjustment may be recorded and logged in a database located, for example, at headend 105. Once controller 180 adjusts remotely, the at least one component in node 110 to the determined setting in stage 330, method 300 may then end at stage 340.

As stated above, controller 180 may be operated by a field technician working on the HFC network comprising node 110. In this case, controller 180 may comprise a tablet device, a smart phone, or a laptop computer for example. The field technician may go to any point on plurality of node communication lines 125, take measurements to determine a problem, and decide what components in node 110 to adjusted in order to fix the problem. From controller 180, the field technician may make these determined adjustments to node 110 (as described above) to fix the problem. The field technician can take further measurements to determine if the adjustments fixed the problem. With conventional systems, the technician would have to climb a pole and physically make adjustments to a conventional node. However, with embodiments of the disclosure, the field technician may make the adjustments remotely with controller 180 saving time and money by not having to go to the conventional node to make adjustments. After the at least one component is adjusted remotely by the filed technician to the determined setting, this adjustment may be recorded and logged in a database located, for example, at headend 105. Furthermore, embodiments of the disclosure may include security credentials that may allow privileges to the field technician to make the aforementioned adjustments.

Figure 4:
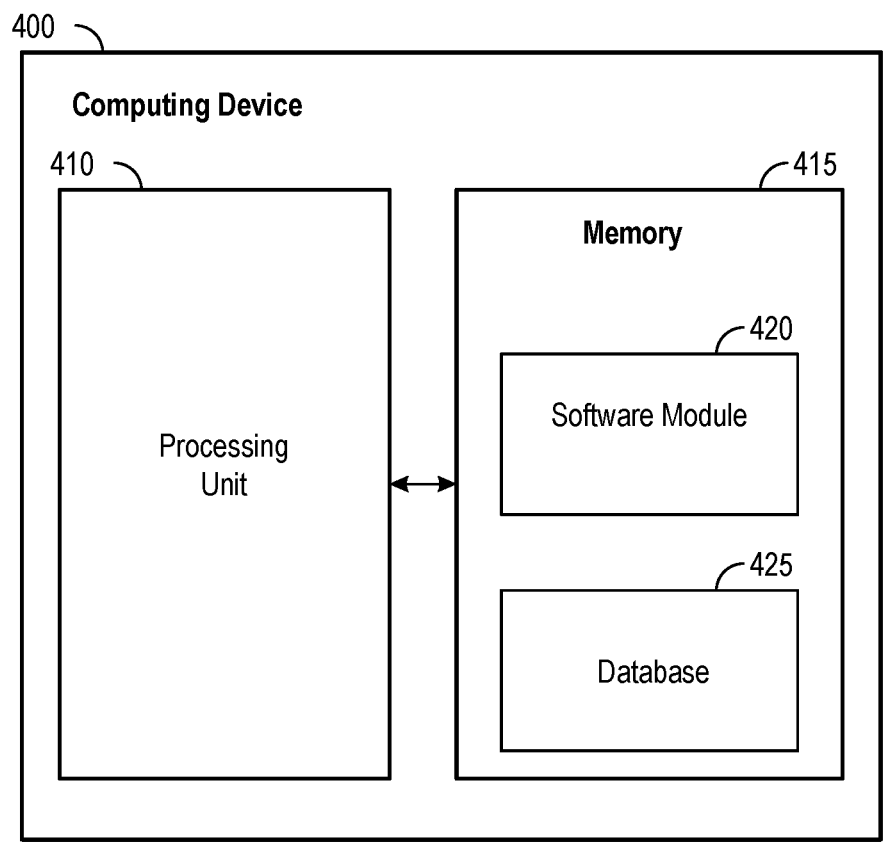
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing automated intelligent node setup and configuration in a Hybrid Fiber-Coaxial (HFC) Network, including for example, any one or more of the stages from method 400 described above with respect to FIG. 4. Computing device 400, for example, may provide an operating environment for controller 180 or control unit 210. Controller 180 and control unit 210 may operate in other environments and is not limited to computing device 400.

Computing device 400 may be implemented using a personal computer, a network computer, a mainframe, a router, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a computing device, a desired operating profile for a node connected in a Hybrid Fiber-Coaxial (HFC) network;
    determining, by the computing device based on the desired operating profile, a setting for at least one component in the node;
    adjusting remotely, by a computing device, the at least one component in the node to the determined setting, wherein adjusting remotely at least one component in the node comprises:
        remotely causing power to a first port of the node to be turned off, the first port feeding a one of a plurality of node communication lines, and
        remotely decreasing power to a second port of the node from a first level to a second level to match a power level of an operating spectrum of a customer premise equipment connected to the second port, the second port feeding the customer premises equipment through another of the plurality of node communication lines; and storing the determined setting and the adjustment to the at least one component in a database located at a headend of the HFC network.

2. The method of claim 1, wherein determining, by the computing device, the desired operating profile for the node connected in the HFC network comprises determining, by the computing device, wherein the computing device is remote from the node.

3. The method of claim 1, wherein determining, by the computing device, the desired operating profile for the node connected in the HFC network comprises determining, by the computing device, wherein the computing device is located at the headend of an operator that operates the HFC network.

4. The method of claim 1, wherein determining, by the computing device, the desired operating profile for the node connected in the HFC network comprises determining, by the computing device, wherein the computing device is remote from the node and operated by a field technician on the HFC network.

5. The method of claim 1, wherein remotely causing the power to the first port of the node to be turned off comprises causing the power to the one of a plurality of node communication lines fed from the node to be turned off.

6. The method of claim 1, wherein remotely decreasing power to a second port of the node from a first level to a second level to match a power level of an operating spectrum of a customer premise equipment connected to the second port comprises adjusting the power to the customer premises equipment connected to another of a plurality of node communication lines fed from the node to match the power level of an operating spectrum of the customer premises equipment connected to the another of the plurality of node communication lines fed from the node.

7. The method of claim 1, wherein determining the desired operating profile for the node connected in the HFC network comprises determining the desired operating profile for the node connected in the HFC network wherein the node is configured to be inoperable when disconnected from the HFC.

8. A system comprising:
a memory storage; and
a processing unit coupled to the memory storage, wherein the processing unit is operative to:
determine a desired operating profile for a node connected in a Hybrid Fiber-Coaxial (HFC) network;
determine, based on the desired operating profile, a setting for at least one component in the node;
adjust remotely the at least one component in the node to the determined setting, wherein the processing unit being operative to adjust remotely at least one component in the node comprises the processing unit being operative to:
remotely cause power to a first port of the node to be turned off, the first port feeding a one of a plurality of node communication lines, and
remotely decreasing power to a second port of the node from a first level to a second level to match a power level of an operating spectrum of a customer premise equipment connected to the second port, the second port feeding the customer premises equipment through another of a plurality of node communication lines; and
store the determined setting and the adjustment to the at least one component in a database located at a headend of the HFC network.

9. The system of claim 8, wherein the computing device is remote from the node.

10. The system of claim 8, wherein the computing device is located at the headend of an operator that operates the HFC network.

11. The system of claim 8, wherein the computing device is remote from the node and operated by a field technician on the HFC network.

12. The system of claim 8, wherein the processing unit being operative to adjust the at least one component in the node to the determined setting comprises the processing unit being operative to cause power to a one of a plurality of node communication lines fed from the node to be turned off.

13. The system of claim 8, wherein the processing unit being operative to adjust the at least one component in the node to the determined setting comprises the processing unit being operative to adjust power to customer premises equipment connected to a one of a plurality of node communication lines fed from the node to match a power level of the customer premises equipment connected to an operating spectrum of the one of the plurality of node communication lines fed from the node.

14. A non-transitory computer-readable medium that stores a set of instructions which when executed perform a method comprising:
determining, by a computing device, a desired operating profile for a node connected in a Hybrid Fiber-Coaxial (HFC) network;
determining, by the computing device based on the desired operating profile, a setting for at least one component in the node;
adjusting remotely, by a computing device, the at least one component in the node to the determined setting, wherein adjusting remotely at least one component in the node comprises:
remotely causing power to a first port of the node to be turned off, the first port feeding a one of a plurality of node communication lines, and
remotely decreasing power to a second port of the node from a first level to a second level to match a power level of an operating spectrum of a customer premise equipment connected to the second port, the second port feeding the customer premises equipment through another of a plurality of node communication lines; and
storing the determined setting and the adjustment to the at least one component in a database located at a headend of the HFC network.

15. The non-transitory computer-readable medium of claim 14, wherein determining, by the computing device, the desired operating profile for the node connected in the HFC network comprises determining, by the computing device, wherein the computing device is remote from the node.

16. The non-transitory computer-readable medium of claim 14, wherein determining, by the computing device, the desired operating profile for the node connected in the HFC network comprises determining, by the computing device, wherein the computing device is located at a headend of an operator that operates the HFC network.

17. The non-transitory computer-readable medium of claim 14, wherein determining, by the computing device, the desired operating profile for the node connected in the HFC network comprises determining, by the computing device, wherein the computing device is remote from the node and operated by a field technician on the HFC network.

18. The non-transitory computer-readable medium of claim 14, wherein adjusting the at least one component in the node to the determined setting comprises causing power to a one of a plurality of node communication lines fed from the node to be turned off.

19. The non-transitory computer-readable medium of claim 14, wherein adjusting the at least one component in the node to the determined setting comprises adjusting power to a one of a plurality of node communication lines fed from the node to match a power level of an operating spectrum of the one of the plurality of node communication lines fed from the node.

20. The non-transitory computer-readable medium of claim 14, wherein determining the desired operating profile for the node connected in the HFC network comprises determining the desired operating profile for the node connected in the HFC network wherein the node is configured to be inoperable when disconnected from the HFC.

* * * * *